(12) United States Patent
Dettinger et al.

(10) Patent No.: US 8,041,728 B2
(45) Date of Patent: Oct. 18, 2011

(54) UTILIZATION OF DISPLAY PROFILES WITH ABSTRACT QUERIES

(75) Inventors: Richard D. Dettinger, Rochester, MN (US); Daniel P. Kolz, Rochester, MN (US); Richard J. Stevens, Rochester, MN (US); Shannon E. Wenzel, Colby, WI (US)

(73) Assignee: International Business Machines Corporation, Armonk, NY (US)

(*) Notice: Subject to any disclaimer, the term of this patent is extended or adjusted under 35 U.S.C. 154(b) by 1320 days.

(21) Appl. No.: 10/955,727

(22) Filed: Sep. 30, 2004

(65) Prior Publication Data
US 2006/0074934 A1 Apr. 6, 2006

(51) Int. Cl.
G06F 17/30 (2006.01)

(52) U.S. Cl. ......... 707/766; 707/721; 707/763; 707/765

(58) Field of Classification Search ........................ None
See application file for complete search history.

(56) References Cited

U.S. PATENT DOCUMENTS

| | | | |
|---|---|---|---|
| 5,253,362 A | 10/1993 | Nolan et al. | |
| 5,428,737 A * | 6/1995 | Li et al. | 707/4 |
| 5,555,403 A * | 9/1996 | Cambot et al. | 707/4 |
| 5,659,724 A * | 8/1997 | Borgida et al. | 707/3 |
| 5,734,887 A | 3/1998 | Kingberg et al. | |
| 5,806,060 A * | 9/1998 | Borgida et al. | 707/3 |
| 5,950,190 A * | 9/1999 | Yeager et al. | 707/3 |
| 6,460,043 B1 | 10/2002 | Tabbara et al. | |
| 6,553,368 B2 | 4/2003 | Martin et al. | |
| 6,581,054 B1 * | 6/2003 | Bogrett | 707/4 |
| 6,601,065 B1 | 7/2003 | Nelson et al. | |
| 6,725,227 B1 | 4/2004 | Li | |
| 6,803,927 B1 | 10/2004 | Sahoo | |
| 6,820,076 B2 | 11/2004 | Bailey et al. | |
| 6,928,431 B2 | 8/2005 | Dettinger et al. | |
| 6,954,748 B2 | 10/2005 | Dettinger et al. | |
| 6,996,558 B2 | 2/2006 | Dettinger et al. | |
| 7,003,730 B2 * | 2/2006 | Dettinger et al. | 715/764 |
| 7,024,425 B2 | 4/2006 | Krishnaprasad et al. | |
| 7,096,229 B2 | 8/2006 | Dettinger et al. | |
| 2003/0169284 A1 * | 9/2003 | Dettinger et al. | 345/708 |
| 2003/0208486 A1 * | 11/2003 | Dettinger et al. | 707/6 |
| 2003/0217049 A1 * | 11/2003 | Cambot et al. | 707/3 |
| 2004/0225643 A1 * | 11/2004 | Alpha et al. | 707/3 |
| 2005/0060309 A1 * | 3/2005 | Scheerer | 707/5 |
| 2005/0086207 A1 * | 4/2005 | Heuer et al. | 707/3 |
| 2005/0216451 A1 * | 9/2005 | Enzler et al. | 707/3 |
| 2006/0004708 A1 * | 1/2006 | Hartmann et al. | 707/3 |
| 2006/0010127 A1 | 1/2006 | Dettinger et al. | |
| 2006/0053096 A1 * | 3/2006 | Subramanian et al. | 707/3 |

OTHER PUBLICATIONS

U.S. Appl. No. 10/083,075, "Application Portability and Extensibility Through Database Schema and Query Abstraction", filed Feb. 26, 2002.
Llama, "Search Your Database", Jan. 18, 2002, Codewalkers, pp. 1-4.
Meng, Weiyi, et al, "A Theory of Translation From Relational Queries to Hierarchical Queries", Apr. 1995, IEEE, pp. 228-245.

* cited by examiner

*Primary Examiner* — Apu M Mofiz
*Assistant Examiner* — Hung D Le
(74) *Attorney, Agent, or Firm* — Patterson & Sheridan, LLP

(57) ABSTRACT

Methods, systems, and articles of manufacture for applying query-level and parameter-level display profiles to abstract queries are provided. Display profiles allow users to utilize existing abstract queries for purposes of data analysis. In one embodiment, display profiles are used to change the scope of an existing abstract query or incorporate existing data processing functions into the abstract query.

17 Claims, 16 Drawing Sheets

PATIENT TABLE

| ID | SS_NUMBER | NAME | GENDER | AGE |
|---|---|---|---|---|
| 1 | 111-11-1111 | BOB | M | 40 |
| 2 | 222-22-2222 | ANGIE | F | 32 |
| 3 | 333-33-3333 | JIM | M | 25 |
| 4 | 444-44-4444 | RENEE | F | 50 |
| 5 | 555-55-5555 | KARL | M | 52 |
| 6 | 666-66-6666 | KRIS | F | 38 |

TEST TABLE

| ID | SS_NUMBER | TEST_A_RESULT | TEST_B_RESULT | TEST_C_RESULT | TEST_CENTER |
|---|---|---|---|---|---|
| 1 | 111-11-1111 | 18 | 40 | 25 | A |
| 1 | 111-11-1111 | 60 | 90 | 20 | A |
| 1 | 111-11-1111 | 70 | 65 | 25 | B |
| 1 | 111-11-1111 | 40 | 70 | 35 | B |
| 3 | 333-33-3333 | 25 | 60 | 30 | A |
| 3 | 333-33-3333 | 10 | 40 | 40 | B |
| 5 | 555-55-5555 | 50 | 30 | 35 | A |
| 5 | 555-55-5555 | 70 | 70 | 30 | B |

(QUERY LEVEL) BASE PHYSICAL QUERY

```
SELECT   P. ID, P. SS_NUMBER, P. AGE, T.TEST_A_RESULT
FROM     PATIENT AS P, TEST AS T
WHERE    P. ID = T. ID
AND      T. TEST_A_RESULT > 50
AND      P. GENDER = MALE
```

| ID (501) | SS_NUMBER (502) | AGE (503) | TEST_A_RESULT (504) |
|---|---|---|---|
| 1 | 111-11-1111 | 40 | 60 |
| 1 | 111-11-1111 | 40 | 70 |
| 5 | 555-55-5555 | 52 | 70 |

FIG. 5B (QUERY LEVEL) MERGED PHYSICAL QUERY  600

601 — SELECT   P. ID, P. NAME, T.TEST_RESULT_A
       FROM     PATIENT AS P, TEST AS T
       WHERE    P. ID IN
602 —           ( SELECT  P. ID
                  FROM    PATIENT AS P, TEST AS T
                  WHERE   P. ID = T. ID
                  AND     T. TEST_RESULT_A > 50
                  AND     P. GENDER = MALE )        } 603
       AND      P. ID = T.ID

(PARAMETER LEVEL) BASE PHYSICAL QUERY

| | |
|---|---|
| SELECT | P. ID, T.TEST_B_RESULT, AGE |
| FROM | PATIENT AS P, TEST AS T |
| WHERE | P. ID = T. ID |
| AND | T. TEST_B_RESULT > 60 |

| ID (801) | TEST_B_RESULT (802) | AGE (803) |
|---|---|---|
| 1 | 90 | 40 |
| 1 | 65 | 40 |
| 1 | 70 | 40 |
| 5 | 70 | 52 |

(PARAMETER LEVEL) PHYSICAL MERGED QUERY

| | |
|---|---|
| SELECT | P. ID, P. AGE, AVG (T.TEST_B_RESULT) |
| FROM | PATIENT AS P, TEST AS T |
| WHERE | P. ID = T. ID |
| AND | T. TEST_B_RESULT > 60 |
| GROUP BY | P. ID, P. AGE |

| ID (901) | AGE (902) | TEST_B_RESULT (903) | |
|---|---|---|---|
| 1 | 40 | 75 | ~904 |
| 5 | 52 | 70 | ~905 |

PARAMETER LEVEL DISPLAY PROFILE APPLIED TO
QUERY LEVEL DISPLAY PROFILE

```
SELECT     P. ID, P. SS_NUMBER, AVG (T.TEST_B_RESULT)
FROM       PATIENT AS P, TEST AS T
WHERE      P. ID IN
           ( SELECT  P. ID
             FROM    PATIENT AS P, TEST AS T
             WHERE   P. ID = T. ID
             AND     T. TEST_B_RESULT > 60 )
AND        P. ID = T.ID
GROUP BY   P. ID, P. SS_NUMBER
```

FIG. 10A

| ID | SS_NUMBER | AVERAGE TEST_B_RESULT |
|---|---|---|
| 1 | 40 | 66.25 |
| 5 | 52 | 50 |
| 1001 | 1002 | 1003 |

FIG. 10B

BASE QUERY:

FIND: ID, SS_NUMBER, TEST_B_RESULT
UNDER CONDITIONS: TEST_B_RESULT > 60

DISPLAY PROFILE:

FIND: ID, SS_NUMBER, NAME, TEST_B_RESULT

JOIN POINTS:

| PICK | PICK |
|---|---|
| ☑ | ID |
| ☐ | SS_NUMBER |

CONTINUE    CANCEL

FIG. 13

UTILIZATION OF DISPLAY PROFILES WITH ABSTRACT QUERIES

CROSS-REFERENCE TO RELATED APPLICATIONS

The present application is related to commonly owned, co-pending U.S. patent application Ser. No. 10/083,075, filed Feb. 26, 2002, entitled "Application Portability And Extensibility Through Database Schema And Query Abstraction", which is incorporated herein by reference.

BACKGROUND OF THE INVENTION

1. Field of the Invention

The present invention generally relates to data processing and more particularly to applying display profiles to queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) and application programming interfaces (API's) such as Java® Database Connectivity (JDBC). The term "query" denominates a set of commands for retrieving data from a stored database. Queries take the form of a command language, such as SQL, that lets programmers and programs select, insert, update, find out the location of data, and so forth.

Unfortunately, generating queries using SQL may require a detailed understanding of the possibly complex physical layout of the underlying database and interpretation of cryptic field names. For some applications, to facilitate the query building process, an abstraction model may be utilized that, in effect, hides some of the complexities of the underlying database physical layout from users. The abstraction model may include logical fields with recognizable names that map to corresponding physical fields of the underlying database. "Abstract" queries may be generated containing conditions based on the logical fields. Upon issuance, the logical fields of an abstract query may be mapped to corresponding physical fields to create a physical or "concrete" query (e.g., an SQL query). For some applications, abstract queries may be saved, allowing subsequent users to reuse the saved abstract queries without having to generate their own. The concepts of data abstraction and abstract queries are described in detail in the commonly owned, co-pending application Ser. No. 10/083, 075, entitled "Improved Application Portability And Extensibility Through Database Schema And Query Abstraction," filed Feb. 26, 2002, herein incorporated by reference in its entirety.

While abstraction models and abstract queries make it easier and more efficient for users to access data within a database, there are situations when users want to alter the scope of the abstract queries and further process the queries' result sets without having to modify the syntax of the queries or create new abstract queries. Altering the scope of abstract queries may include, for example, considering additional query conditions directed to expanding a result set, restrict the result set or even calling existing data processing functions to manipulate data within the result set. Unfortunately, the infrastructure facilitating the abstraction model may not be flexible enough to allow for the further use of existing abstract queries and their result sets for such purposes without modifying the syntax of the original abstract queries. One alternative is to create a completely new abstract query, which may be based on combining the syntax of the existing abstract query with the syntax of additional query conditions directed to altering the result set as required by the user. There may be instances where a particular group of query conditions may need to be applied to numerous abstract queries, necessitating the creation of many new abstract queries comprising identical syntax representing query conditions.

Those skilled in the art will acknowledge that the process described above is inefficient, time consuming and wasteful of resources due to redundancies. Therefore, what is needed is a solution that allows for the ability to use previously defined abstract queries (and their corresponding result sets) by allowing for the application of additional query conditions to these base queries. Further, the group of additional query conditions should be packaged in a module and presented in abstract form so that it is convenient for the collection of additional query conditions to be selected for application to other base queries, as required by the user. In other words, the modules comprising additional query components should be capable of being applied to multiple abstract queries.

SUMMARY OF THE INVENTION

The present invention is generally directed to methods, systems and articles of manufacture for applying query-level and parameter-level display profiles to abstract queries.

One embodiment of the present invention provides a data processing system for composing queries. The data processing system generally includes a data repository containing physical data structures containing data, an abstract model comprising logical field definitions mapped to the physical data structures in the data repository, a plurality of pre-defined abstract queries defined according to the abstract model and configured to retrieve the data from the data repository by referencing the abstract model, and a plurality of display profiles comprising a plurality of abstract query conditions defined according to the abstract model. The data processing system further includes a query processor configured to (i) convert one or more selected pre-defined abstract queries into one or more executable queries of a given query language by referencing the abstract model, (ii) convert one or more selected display profiles into transformed instances of the one or more selected display profiles by referencing the abstract model, wherein the transformed instances of the one or more selected display profiles are in the given query language, and then (iii) combine the one or executable queries and the transformed instances of the one or more selected display profiles to produce a merged executable query, while preserving the syntax of the one or more selected pre-defined abstract queries in the merged executable query.

Another embodiment of the present invention provides a computer implemented method for composing queries. The computer implemented method generally includes providing a data repository containing physical data structures containing data, providing an abstract model comprising logical field definitions mapped to the physical data structures in the data repository, and providing a plurality of pre-defined abstract queries configured to retrieve the data from the data repository by referencing the abstract model. The computer implemented method also includes receiving a selected abstract query, selected by a user from the plurality of pre-defined abstract queries, on the basis of the selected abstract query, determining one or more display profiles that can be applied to the selected abstract query, wherein the display profiles comprise a plurality of abstract query conditions, displaying to the user the one or more display profiles, and receiving a selected display profile selected by the user from the one or more display profiles displayed to the user. The computer implemented method further includes transforming the selected abstract query to an executable query of a given query language by referencing the abstract model, transforming the selected display profile into a transformed instance of the selected display profile by referencing the abstract model, wherein the transformed instance of the selected display profile is in the given query language, and generating a merged executable query corresponding to a combination of the executable query and the transformed instance of the selected display profile in which the syntax of the executable query is preserved, and wherein the executable query and the transformed instance of the selected display profile are linked at a join point defined by a field specified in the selected abstracted query and the selected display profile.

Another embodiment of the present invention provides a computer implemented method for composing queries. The computer implemented method generally includes providing a data repository containing physical data structures containing data, providing an abstract model comprising logical field definitions mapped to the physical data structures in the data repository, and providing a plurality of pre-defined abstract queries configured to retrieve the data from the data repository by referencing the abstract model. The computer implemented method also includes receiving a selected abstract query selected by a user from the plurality of pre-defined abstract queries, on the basis of the selected abstract query, determining one or more query-level display profiles that can be applied to the selected abstract query, wherein query-level display profiles comprise a plurality of abstract query conditions, and are configured to alter the scope of the selected abstract query while preserving the syntax of the selected abstract query, displaying to the user the one or more query-level display profiles, and receiving a selected display profile selected by the user from the one or more query-level display profiles displayed to the user. The computer implemented method also includes transforming the selected abstract query to an executable query of a given query language by referencing the abstract model, transforming the selected display profile into a transformed instance of the selected display profile by referencing the abstract model, wherein the transformed instance of the selected display profile is in the given query language, and generating a merged executable query corresponding to a combination of the executable query and the transformed instance of the selected display profile in which the syntax of the executable query is preserved, and wherein the executable query and the transformed instance of the selected display profile are linked at a join point defined by a field specified in the selected abstracted query and the selected display profile.

Another embodiment of the present invention provides a computer implemented method for composing queries. The computer implemented method generally includes providing a data repository containing physical data structures containing data, wherein the data repository is managed by a database management system, providing an abstract model comprising logical fields mapped to the physical data structures in the data repository, and providing a plurality of pre-defined abstract queries configured to retrieve the data from the data repository by referencing the abstract model. The computer implemented method also includes receiving a selected abstract query selected by a user from the plurality of pre-defined abstract queries, on the basis of the selected abstract query, determining one or more parameter-level display profiles that can be applied to the selected abstract query, wherein parameter-level display profiles comprise a plurality of abstract query conditions and call existing functions to further process result sets of the selected abstract query while preserving the syntax of the selected abstract query, displaying to the user the one or more parameter-level display profiles, and receiving a selected display profile selected by the user from the one or more parameter-level display profiles that can be applied to the selected abstract query. The computer implemented method also includes transforming the selected abstract query to an executable query of a given query language by referencing the abstract model, transforming the selected display profile into a transformed instance of the selected display profile by referencing the abstract model, wherein the transformed instance of the selected display profile is in the given query language, and generating a merged executable query corresponding to a combination of the executable query and the transformed instance of the selected display profile in which the syntax of the executable query is preserved, and wherein the executable query and the transformed instance of the selected display profile are linked based on associations defined between one or more fields from the selected abstract query and one or more parameters from the selected display profile.

Another embodiment of the present invention provides a computer implemented method for composing queries. The computer implemented method generally includes providing a data repository containing physical data structures containing data, wherein the data repository is managed by a database management system, providing an abstract model comprising logical fields mapped to physical data structures in the data repository, providing a plurality of pre-defined abstract queries configured to retrieve data from the data repository by referencing the abstract model, receiving a selected abstract query selected by a user from the plurality of pre-defined abstract queries, on the basis of the selected abstract query, determining one or more query-level display profiles that can be applied to the selected abstract query, wherein query-level display profiles comprise a plurality of abstract query conditions, and are configured to alter the scope of the selected abstract query while preserving the syntax of the selected abstract query, and displaying to the user the one or more query-level display profiles. The computer implemented method also includes receiving a first selected display profile selected by the user from the one or more query-level display profiles displayed to the user, on the basis of the selected abstract query, determining one or more parameter-level display profiles that can be applied to the selected abstract query, wherein parameter-level display profiles comprise a plurality of abstract query conditions and call existing functions to further process result sets of the selected abstract query while preserving the syntax of the selected abstract query, displaying to the user the one or more parameter-level display profiles, and receiving a second selected display profile selected by the user from the one or more parameter-level display profiles that can be applied to the selected abstract query. The computer implemented method also includes transforming the selected abstract query to an executable query of a given query language by referencing the abstract model, transforming the first selected display profile to a transformed instance of the first selected display profile by referencing the abstract model, wherein the first transformed instance of the first selected display profile is in the given query language, transforming the second selected display profile to a transformed instance of the second selected display profile by referencing the abstract model, wherein the transformed instance of the selected display profile is in the given query language, and generating a merged executable query corresponding to a combination of the executable query, the transformed instance of the fist selected display profile and the transformed instance of the second selected display profile, in which the syntax of the executable query is preserved.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates an exemplary table according to one embodiment of the invention that is used to support examples demonstrating the use of query-level and parameter-level display profiles.

FIG. 4 illustrates another exemplary table, according to one embodiment of the invention that is used to support examples demonstrating the use of query-level and parameter-level display profiles.

FIG. 5A illustrates an exemplary base query in physical form.

FIG. 5B illustrates a result set that corresponds to the query presented in FIG. 5A.

FIG. 8A illustrates an exemplary base query in physical form.

FIG. 8B illustrates a result set that corresponds to the query presented in FIG. 8A.

FIG. 9A illustrates a merged physical query.

FIG. 9B illustrates a result set that corresponds to the query presented in FIG. 9A.

FIG. 10A illustrates a physical merged query that is based on the serial application of a parameter-level display profile on top of a query-level display profile that has been applied onto a base query.

FIG. 10B illustrates a result set that corresponds to the query presented in FIG. 10A.

FIGS. 11-14 illustrate exemplary graphical user interface (GUI) screens in accordance with embodiments of the present invention.

DETAILED DESCRIPTION OF THE PREFERRED EMBODIMENTS

Figure 1:
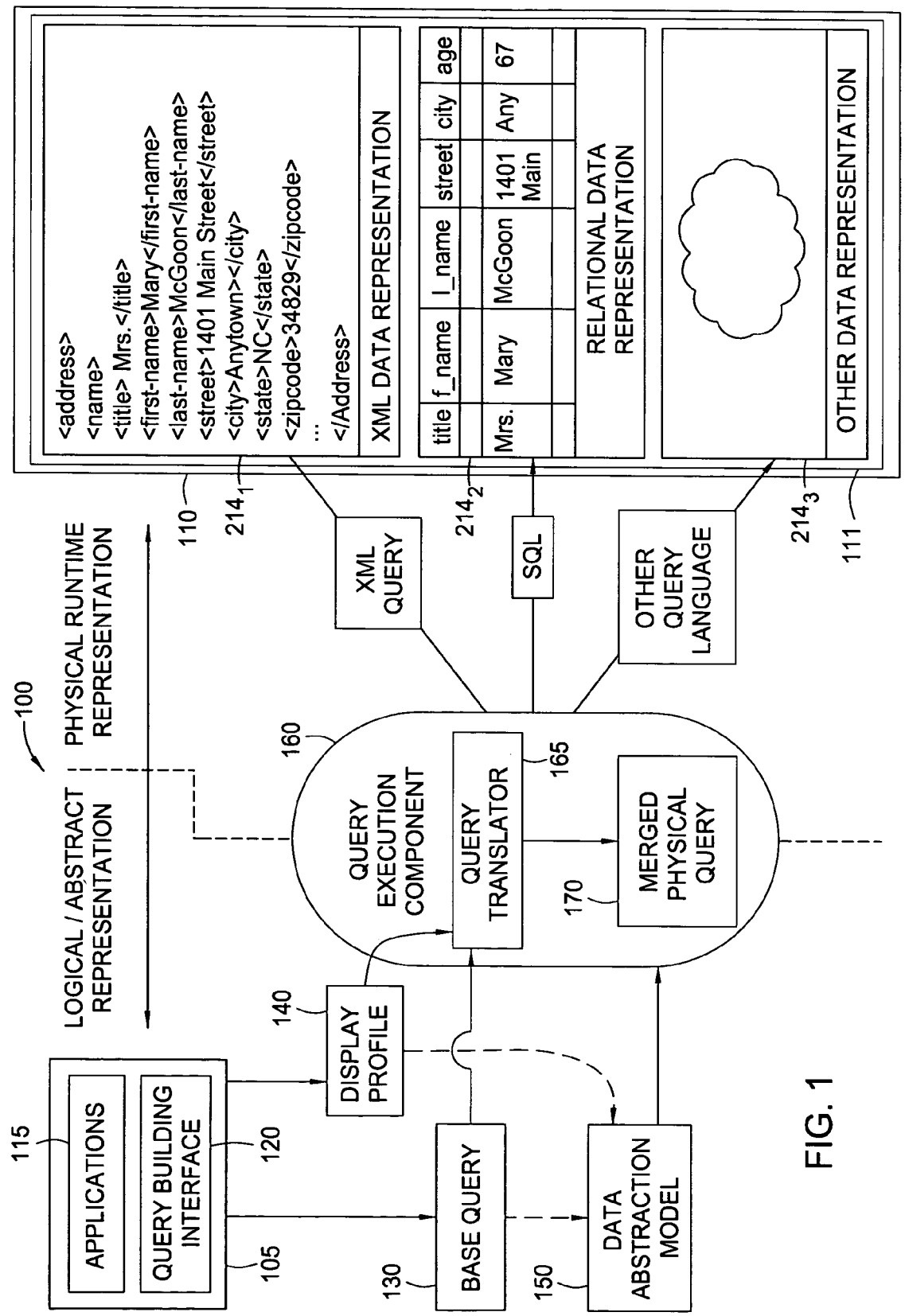
FIG. 1 is a relational view of software and hardware components of one embodiment of the invention.

The present invention is generally directed to methods, systems and articles of manufacture for enhancing abstract queries by utilizing query-level and parameter-level display profiles.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term database generally refers to a collection of data arranged for ease and speed of search and retrieval. While the following description focuses on transaction statements (such as queries) for relational databases, those skilled in the art will recognize the methods described herein may be used with any type of database including an object-relational database and an XML-based database.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii)

alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

An Exemplary System

FIG. 1 illustrates a relational view of hardware and software components of a data processing system 100 in accordance with one embodiment of the invention. The system 100 illustratively includes a client computer system 105 comprising a variety of applications including a query building interface 120 for accessing data in a database 111, via a database management system (DBMS) 110. As illustrated, the database 111 may accommodate data in a variety of different physical representations 214, such as extensible markup language (XML) representation $214_1$, relational representation $214_2$, or some other data representation $214_3$.

The system 100 may include a data abstraction model (DAM) 150 that, in effect, shields a user from the details of the particular physical representation of the database 111. The DAM 150, also referred to as a data repository abstraction (DRA) in related applications, may define a set of logical fields that map to underlying physical fields of the underlying database 111. Users may be able to create abstract queries based on the logical fields, via the query building interface 120. Upon issuance of abstract queries, a query execution component 160 may convert an abstract query into a physical or "concrete" query suitable for issuance against the database 111 by mapping logical fields of the abstract query to physical fields of the particular physical representation 214, based on the field definitions in the DAM 150. The mapping of abstract queries to physical queries, by the query execution component 160, is described in detail in the previously referenced U.S. patent application 10/083,075.

Embodiments of the present invention facilitate the use of previously defined abstract queries and their corresponding result sets. A previously defined abstract query to which the user wishes to add query conditions is referred to as a base query 130. Additional query conditions can be applied to the base query 130 as specified by the user. These additional query conditions are packaged in a display profile 140. Display profiles 140 are similar in form to abstract queries, but are designed to be applied to (or combined with) a base query. The modular aspect of display profiles 140 allows them to be applied to any base query 130 with which linkage can be defined. The linkage between base queries 130 and display profiles 140 will be described in more detail later.

Users are allowed to select a base query 130 to which they would like to add query conditions. Based on their selection of a base query 130, they are provided a set of display profiles 140 which can be applied to the base query 130. It should be noted that base queries 130 and display profiles 140 are in abstract form when presented to the user. Once the user has selected a base query 130 and a display profile 140, they are both submitted to the query execution component 160. Within the query execution component 160, a query translator 165 converts both components into physical queries, combines them and produces a merged physical query 170. As used herein, the term physical queries may also be referred to as executable queries.

Two types of display profiles are described herein: query-level display profiles and parameter-level display profiles. Query-level display profiles alter the scope of an existing abstract query (or base query). For example, at the physical layer, the query-level display profile (described in terms of SQL) would automatically incorporate the use of outer joins, inline views and correlated subqueries to expand or restrict the scope of a particular base query 130. Query-level display profiles are described with reference to FIGS. 2, 5 and 6.

Parameter-level display profiles, on the other hand, programmatically encase the base query 130 and incorporate the use of existing functions to further process the result sets of base queries. For example, in the context of SQL, group functions such as AVERAGE, MAXIMUM and MINIMUM can be utilized. Further, parameter-level display profiles utilize parameters to allow users to choose the field of the base query's 130 result set that is to be processed by the functions. Parameter-level display profiles are described with reference to FIGS. 7, 8, and 9.

Operations for generating a merged physical query 170 based on applying a query-level display profile 140 to a base query 130 are described with reference to FIG. 2, and operations related to applying a parameter-level display profile 140 to a base query 130 are described with reference to FIG. 7. Several examples of base queries 130, display profiles 140 and merged physical queries 170 are provided in the discussion below. The data and query examples included herein pertain to medical testing of patients. However, it should be understood that the functionality provided by embodiments of the present invention can be utilized in any data processing environment in which databases are maintained and data analysis facilities are provided.

Figure 2:
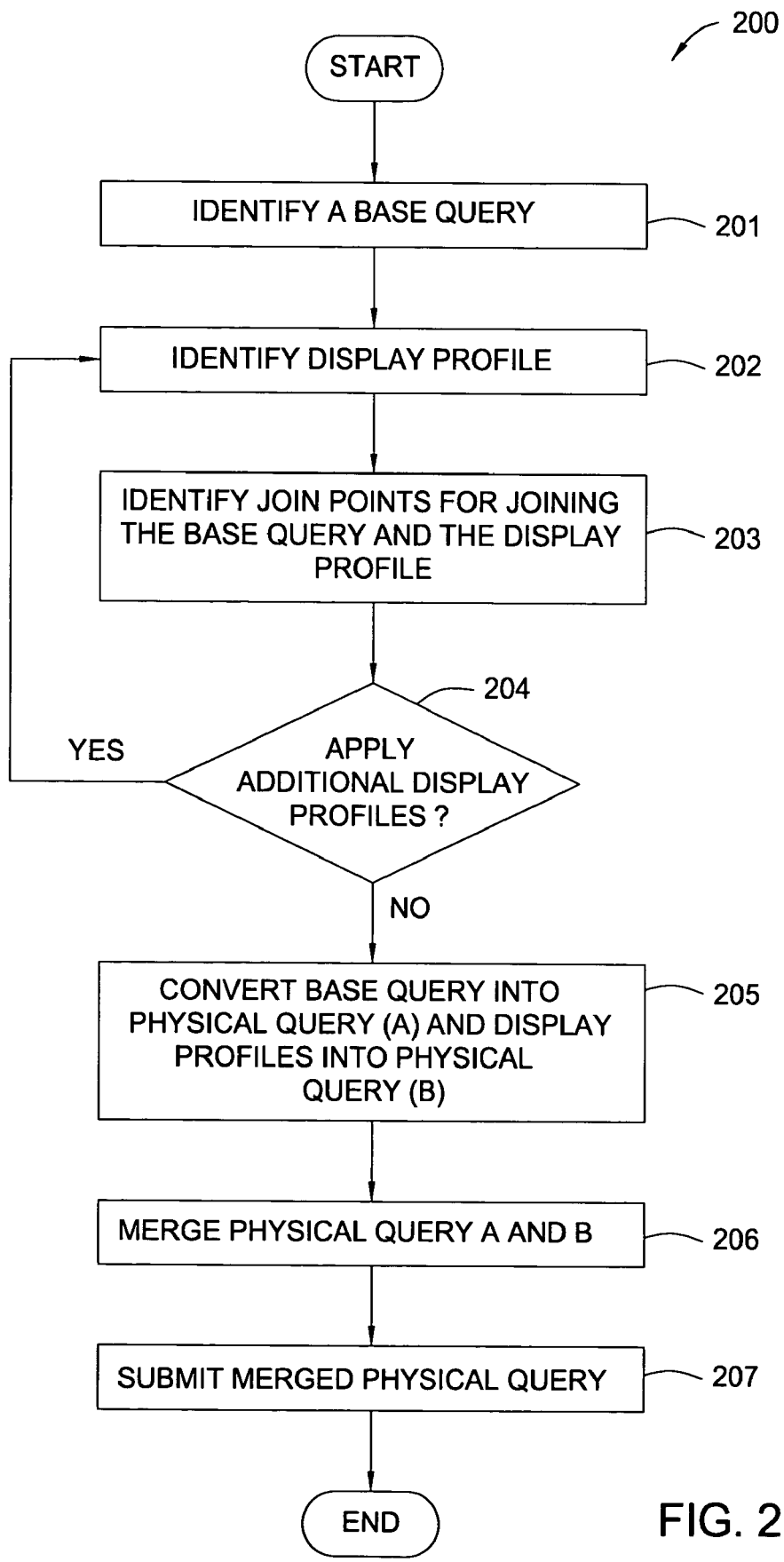
FIG. 2 is a flow diagram of exemplary operations for the creation of a physical query based on applying a query-level display profile to a base query according to one embodiment of the invention.

FIG. 2 is a flow diagram of exemplary operations for the creation of a merged physical query based on applying an appropriate query-level display profile 140 to a base query 130 according to one embodiment of the invention. For some embodiments a particular query-level display profile is determined to be appropriate for application to a base query if both the base query and query-level display profile comprise the same fields.

Operations 200 begin at step 201 when a base query 130 is selected. For some embodiments of the current invention, a base query 130 may be selected from a collection of previously defined abstract queries. For other embodiments, an abstract query may be defined by a user immediately prior to being selected as a base query 130. Similarly, for some embodiments, display profiles may be selected from a collection of previously defined display profiles, or they may be defined immediately prior to being selected.

Next, a loop of operations (202-204) directed to the application of one or more display profiles 140 is entered. At step 202, a display profile 140 is selected. As stated above, query-level display profiles 140 may be used to alter the scope of the base query 130. However, there needs to be a linkage between the base query 130 and the display profile 140. Accordingly, at step 203 join points are selected to define the linkage between the base query and the current display profile. As will be described with reference to example queries below, join points may comprise one ore more fields that the base query 130 and display profile 140 have in common.

At step 204, it is determined if the user desires to apply any additional display profiles 140. As will be described in more detail with reference to Table V and FIG. 10, display profiles can be serially applied on top of one another. If additional display profiles 140 are to be applied, processing reverts to step 202 for applying the next display profile 140 on top of the current display profile 140 and base query 130 combination. Otherwise, processing proceeds to step 205. At step 205, the base query 130 and the display profile 140 are converted by the query translator 165 into respective physical queries that correspond to the base query and each of the applied display profiles. The physical queries are consolidated into a merged physical query 170 at step 206. Finally, at step 207, the merged physical query 170 is submitted to the RDBMS 110 for execution.

At the physical layer, applying a query-level display profile alters the scope of an existing abstract query by automatically generating a merged physical query 170 that utilizes SQL functionality such as outer joins, inline views or correlated subqueries to expand or restrict the scope of a particular base query 130. It should be noted that examples of the application of query-level display profiles described herein utilize correlated subqueries. However, it should be understood that the steps described with reference to operations 200 also apply to the use of outer joins and inline views.

In order to describe an implementation of the flow described with reference to FIG. 2 in more detail, a discussion utilizing exemplary base queries and display profiles is provided below. Further, in order to better understand base queries and display profiles and their corresponding merged physical queries, it would be beneficial to review the underlying database tables on which the queries are based. To that end, exemplary database tables according to one embodiment of the invention are shown in FIGS. 3 and 4.

FIG. 3 illustrates an exemplary database table according to one embodiment of the invention. The Patient table 300 contains records (or entries) that pertain to patients that are undergoing medical testing in a healthcare research environment. The patient table comprises five columns 301-305. The ID column 301 contains a unique ID number that is assigned to each patient. The patient's Social Security number is stored in the SS_NUMBER column 302. Similarly, the patient's name, gender and age are recorded in the respective columns 303, 304 and 305.

FIG. 4 illustrates another exemplary database table according to one embodiment of the invention. As its name implies, the Test table 400 contains records pertaining to tests performed on patients. The test table 400 comprises six columns 401-406. Similar to the patient table 300, the Test table's 400 ID column 401 contains a unique ID number that is assigned to each patient, and patient's Social Security number is stored in the SS_NUMBER column 402. The primary purpose of the Test table 400 is to store quantitative test results for tests A, B, and C in columns 403, 404 and 405, respectively. The data values contained in the TEST_CENTER column 406 indicate the test center in which patients underwent testing.

It should be noted that if patients have taken tests A, B, and C on multiple occasions, a separate row is provided in the Test table 400 for each round of testing. For instance, the patient with the assigned ID of "1" has undergone four rounds of testing and, accordingly, has four corresponding records 410 that contain the results of those rounds of tests. Similarly, patients with ID's of "3" and "5" have each undergone two rounds of testing, 411 and 412, respectively.

It should be also noted that ID and SS_NUMBER columns appear in both the Patient table 300 and Test table 400. Those skilled in the art will recognize that the presence of both these columns in each of the tables facilitates "joining" these tables via queries. Most of the abstract queries and physical queries described herein utilize joins between the Patent table 300 and Test table 400.

TABLE I

BASIC QUERY EXAMPLE IN ABSTRACT FORM

| 01 | Find: ID, SS Number, Age, Test A Result |
|---|---|
| 02 | Under Conditions: Test A Result > 50 and Gender = Male |

Table I, shown above, lists a selected base query in abstract form. The base query specifies that a patient's ID, Social Security number, age and Test A Result be returned under the conditions that the Test A Result is greater than 50 and the gender of the patient is male.

Exemplary query syntax 500 shown in FIG. 5A illustrates the physical form of the base query listed in Table I. For one embodiment, the physical environment comprises relational databases managed by an RDBMS. Accordingly, the physical query is represented with SQL syntax. The results corresponding to exemplary query 500 are shown in FIG. 5B. It should be noted that columns 501-504 correspond directly to the elements specified in the SELECT portion of the exemplary query 500.

Suppose that upon reviewing the result set 550 corresponding to the base query 130 described with reference to Table 1 and FIG. 5, the user wants to expand on the result set. For instance, the user may want to expand the result set to include all records for patients that had at least one instance in which the Test A Result is greater than 50, rather than only instances in which the Test A Result is greater than 50. According to one embodiment of the present invention, the user can select a display profile 140 to be applied to the base query 130 to facilitate the expansion of the base query's result set. Table II below lists the base query of Table I and an appropriate display profile (both in abstract form) that will provide the desired result set, which is the ID, SS Number, Age and Test A Result for all records pertaining to patients that had a Test A Result greater than 50 at least once.

Conceptually, application of the display profile (line 003) to the base query (lines 001-002) of Table II represents the retrieving results comprising the ID, SS Number, Age and Test A Result for all male patients (corresponds to the display profile) that have recorded at least one Test A Result >50 (corresponds to the base query). This description is based on the ID field being specified as the linkage, or join point, between the particular base query and display profile of Table II. Join points are described in more detail below.

TABLE II

SELECTED BASE QUERY AND QUERY-LEVEL DISPLAY PROFILE

| Base Query: | |
|---|---|
| 01 | Find: ID, SS Number, Age, Test A Result |
| 02 | Under Conditions: Test A Result > 50 and Gender = Male |
| Display Profile: | |
| 03 | Find: ID, SS Number, Age, Test A Result |

Figures 6A, 6B:
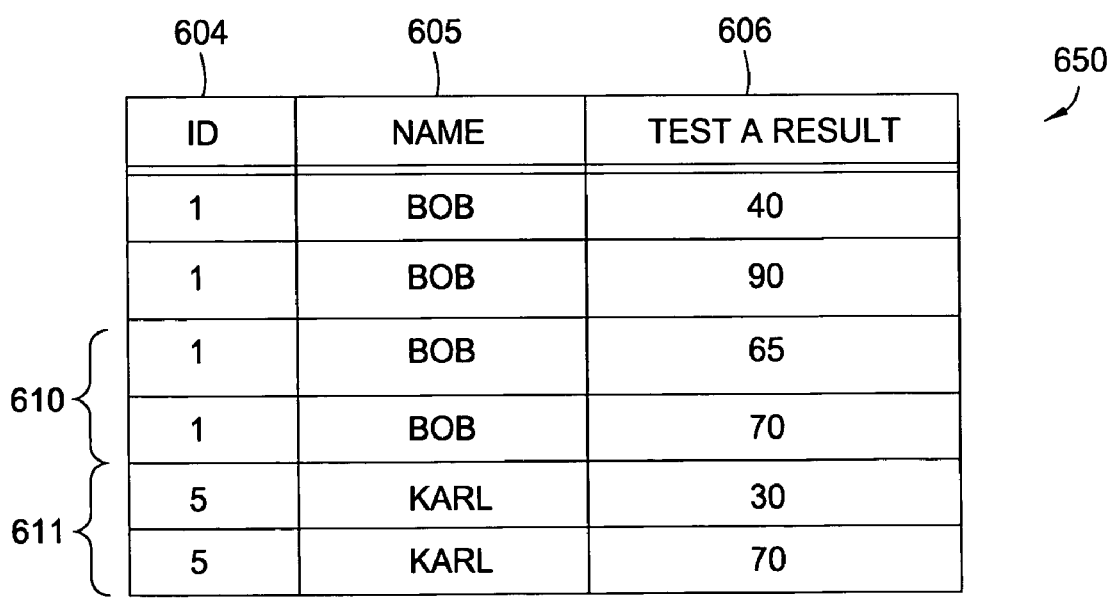
FIG. 6A illustrates a merged physical query.
FIG. 6B illustrates a result set that corresponds to the query presented in FIG. 6A.

Exemplary syntax 600 corresponding to a merged physical query 170 based on the base query 130 and display profile 140 of Table II is provided in FIG. 6A. It should be noted that there are three main components to this physical query: the display profile component 601, the join point component 602 and the base query component 603. The base query component 603 of the syntax 600 is almost identical to the query syntax 500, which corresponds to the base query 130.

As its name implies, the join point 602 is the link between the display profile 140 and the base query 130. For one embodiment, the join point 602 is a field that is utilized in the WHERE clause for purposes of connecting an outer query with a subquery in a correlated subquery implementation. Typically, fields that are present in both the base query and the display profile can be utilized as join points. The user may select a particular field to be a join point if they desire to alter the scope of the base query based on that field.

Other embodiments of the present invention may generate statements that utilize outer joins or inline views. While the syntax of the SQL statements for outer joins and inline views will be different, those skilled in the art will recognize that fields specified as join points will also serve as links between base queries and query-level display profiles in these different implementations.

As shown in the syntax 600 in FIG. 6A, for one embodiment of the present invention, correlated subqueries are used and the join point 602 provides the column in the WHERE clause that links a correlated sub-query to the main query. For the example base query 130 and display profile 140 of FIG. 6A, the ID column serves as the join point 602. However, it should be noted that like the ID column, the SS Number column is also included in both the base query 130 and display profile 140 listed in Table II. If desired, the user could have specified that the SS Number be the join point between the base query and display profile rather than ID column. Alternatively, the user could also have specified that both ID and SS Number could be selected as join points. The selection of join points is described further with reference to FIG. 13.

FIG. 6B presents a result set corresponding to the merged physical query represented by syntax 600. As with FIG. 5B, the results corresponding to query 600 is provided in a table comprising the ID column 604, NAME column 605 and TEST_A_RESULT column 606. The result set contains four records 610 associated with an ID of "1" and two records with an ID of "5". It should be noted that unlike the query results described with reference to FIG. 5, even those records with TEST_A_RESULT values less than 50 are presented. Again, this is because applying the display profile to the base query of Table II specifies that all records be shown pertaining to ID's with at least one TEST_A_RESULT >50.

Figure 7:
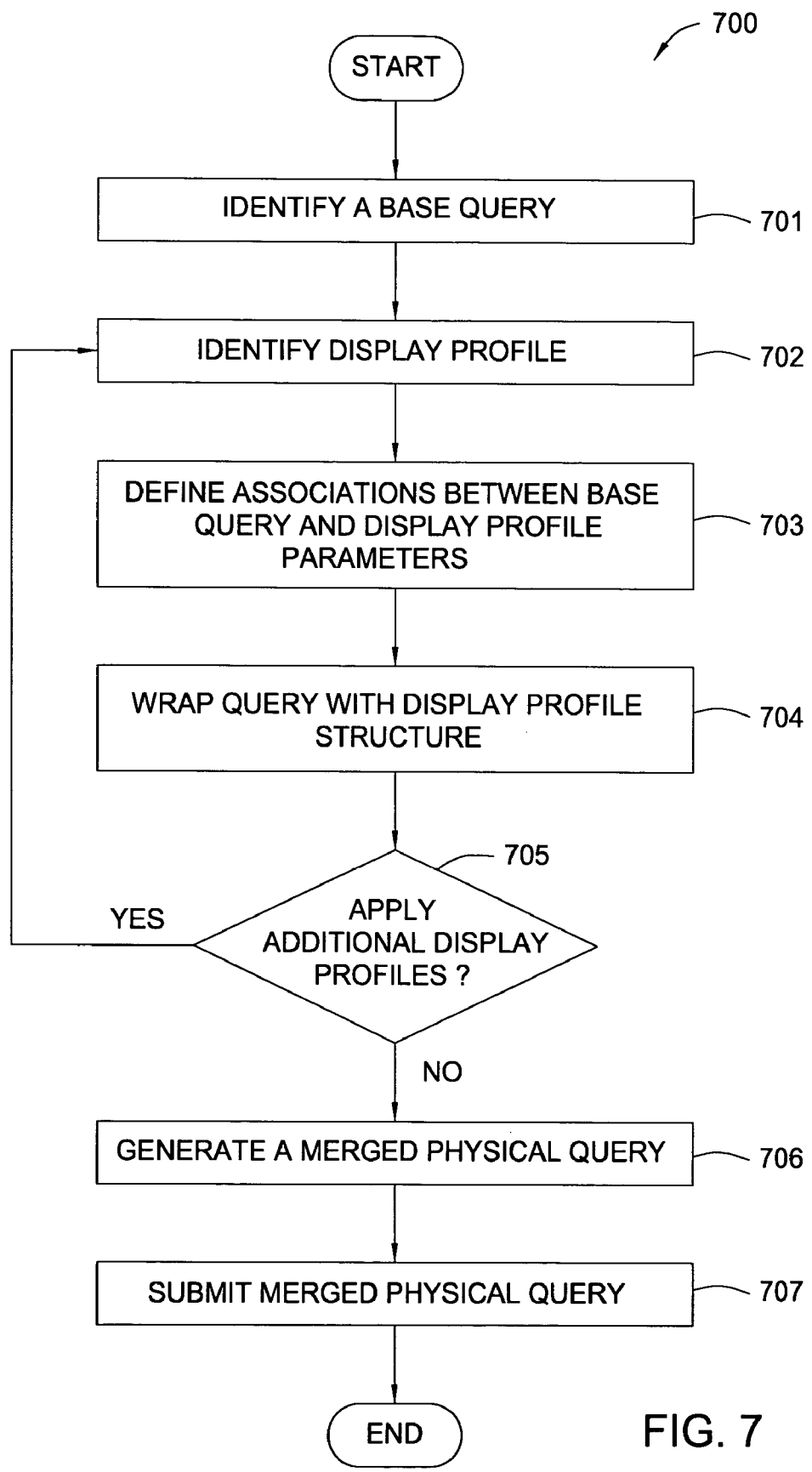
FIG. 7 illustrates a flow diagram of exemplary operations 700 for the creation of a merged physical query based on applying a parameter-level display profile to a base query according to one embodiment of the invention.

FIG. 7 illustrates a flow diagram of exemplary operations 700 for the creation of a merged physical query based on applying a parameter-level display profile to a base query according to one embodiment of the invention. As stated earlier, parameter-level display profiles encase or "wrap" a base query 130 and may call existing functions to further process particular fields in the result sets of base queries. Examples of existing functions that may be called include SQL based group functions such as AVERAGE, MAXIMUM and MINIMUM. Group functions are well known in the art to return a single result based on many rows, and are often used to aggregate data. Users are provided with facilities to input values for parameters in order to choose the field of the base query's 130 result set that is to be processed by the functions, and also the field (or combination of fields) by which the result set is to be grouped.

Operations 700 begin at step 701 when a base query 130 is selected. Next, a loop of operations including steps 702 through 705 is entered. At step 702, a parameter-level display profile 140 that is to be applied to the base query 130 is identified. At step 703, associations are defined between the base query 130 and the display profile 140 parameters. Forming associations may include defining linkage(s) between elements of the display profile, such as columns and parameters, and the elements of the base query.

Next, at step 704, the base query is "wrapped" by the display profile 140. In other words, the base query 130 is embedded within the display profile 140. The display profile 140 defines the format of final query results that will be presented to the user. At step 705, it is determined if the user desires to apply any other display profiles. Parameter-level display profiles can also be serially applied on top of the other. If additional display profiles are to be applied, processing reverts to step 202 for the next display profile. Otherwise, processing continues to step 705. Once all the desired display profiles have been applied, a physical merged query is generated at step 706 and, at step 707, the query is submitted to the RDBMS.

TABLE III

BASIC QUERY EXAMPLE IN ABSTRACT FORM

| 01 | Find: ID, Test B Result, Age |
|---|---|
| 02 | Under Conditions: Test B Result > 60 |

Table III, shown above, lists another selected base query 130 in abstract form. As with the other example queries described above, this query also joins the Patient and Test tables illustrated in FIGS. 3 and 4. The base query 130 specifies that a patient's ID, Test B Result and Age be returned under the conditions that the Test B Result is greater than 60. The corresponding physical base query syntax 800 is presented in FIG. 8A, while the result set is presented in a tabular format in FIG. 8B—the result set table comprises an ID column 801, TEST_B_RESULT column 802 and AGE column 803. It should be noted that only the records with TEST_B_RESULT values greater than 60 are presented, as specified in the base query.

Suppose the user wanted to get an average Test B Result for each patient from the result set corresponding to the base query 130 listed in Table III. Table IV, shown below, lists the base query 130 and a display profile 140 that can be applied to the base query to provide the average Test B Value.

TABLE IV

SELECTED BASE QUERY AND PARAMETER-LEVEL DISPLAY PROFILE

Base Query:

| | |
|---|---|
| 01 | Find: ID, Age, Test B Result |
| 02 | Under Conditions: Test B Result > 60 |

Display Profile:

| | |
|---|---|
| 03 | Find: AVERAGE (PARAMETER 1) |
| 04 | GROUP BY (PARAMETER 2) |

As mentioned earlier, parameter-level display profiles wrap the base query 130 and incorporate the use of existing functions to further process the result sets of base queries. In the case of the example base query and display profile of Table IV, the base query specifies that a patient's ID, Age and Test B Result be returned under the conditions that the Test B Result is greater than 60. The display profile includes a call to an AVERAGE function that averages all the values pertaining to a particular field for a group of records. The records are grouped by the values pertaining to another field.

In order to provide the required results (i.e., get an average Test B Result for each patient from the result set corresponding to the base query) the display profile of Table IV wraps the base query by applying the AVERAGE function to the Test B Result field and then grouping by the ID field. The corresponding physical query syntax and result set are presented in FIGS. 9A and 9B, respectively.

The commonalities between the result set associated with the physical base query of FIG. 8A and the result set corresponding to the merged physical query 900 of FIG. 9A should be noted. As expected, in the result set of FIG. 9B, all instances of patients with the ID of "1" and "5" are represented by a single row each and the average Test B Result is presented.

It should be understood that users provide input values (typically field names) for parameters in parameter-level display profiles. For instance, the particular display profile applied in the above example has two parameters: PARAMETER 1 for the AVG function and PARAMETER 2 for the Group By clause. The values supplied for PARAMETER 1 and PARAMETER 2 were "Test B Result" and "ID", respectively. The process of allowing users to select the parameter values will be described further with reference to FIG. 14.

As described earlier with reference to operations 200 and 700 in FIGS. 2 and 7, respectively, embodiments of the present invention provide for the applying of display profiles on top of other display profiles which are applied to base queries. Applying display profiles in this manner is referred to herein as the serial application of display profiles.

TABLE V

SERIAL APPLICATION OF A DISPLAY PROFILES

Base Query:

| | |
|---|---|
| 01 | Find: ID, SS Number, Test B Result |
| 02 | Under Conditions: Test B Result > 60 |

Query-Level Display Profile:

| | |
|---|---|
| 03 | Find: ID, SS Number, Test B Result |

TABLE V-continued

SERIAL APPLICATION OF A DISPLAY PROFILES

Parameter-Level Display Profile:

| | |
|---|---|
| 04 | Find: AVERAGE (PARAMETER 1) |
| 05 | GROUP BY (PARAMETER 2) |

Table V, shown above, lists a base query and two display profiles. The base query specifies that a patient's ID, Social Security number, and Test B Result be returned for each instance that the Test B Result is greater than 60. Applying the query-level display profile (line 003) to the base query specifies that a patient's ID, Social Security number, and Test B Result be returned for all instances if the patient has on at least one occasion recorded a Test B Result greater than 60. Finally, applying the parameter-level display profile (lines 004-005) on top of the query-level display profile, which itself is applied on top of the base query, specifies the following: a patient's ID, Social Security number, and the patient's average Test B Result for all instances should be returned if the patient has on at least one occasion recorded a Test B Result greater than 60. It should be noted that this version of the serially applied display profiles of Table V assumes that the user has selected Test B Result as the input for PARAMETER 1 and the combination of ID and Social Security number as the input for PARAMETER 2 with respect to the parameter-level display profile (lines 004-005).

FIG. 10A illustrates query syntax 1000 for a physical merged query 170 that corresponds to the serial application of a parameter-level display profile on top of the query-level display profile that has been applied to the base query 130 from Table V. The syntax 1000 provides functionality that is equivalent to the functionality described with reference to Table V. The similarities between the queries described with reference to FIGS. 9A and 10A should also be noted.

Reference is now made to FIG. 10B which shows the result set corresponding to the physical merged query 170 shown above. It should be noted that only the ID's that had at least one instance with the Test B Result value greater than 60 are included. Further, it can be seen that the result set is very similar to that described with reference to FIG. 9B. The difference in the result sets is the average Test B Result values are lower in FIG. 10B than in FIG. 9B because in the query results shown in FIG. 10B the average Test B Results include all instances, while the average shown in FIG. 9B only includes those instances where the Test B Result is greater than 60.

An Exemplary Graphical User Interface

Figure 11:
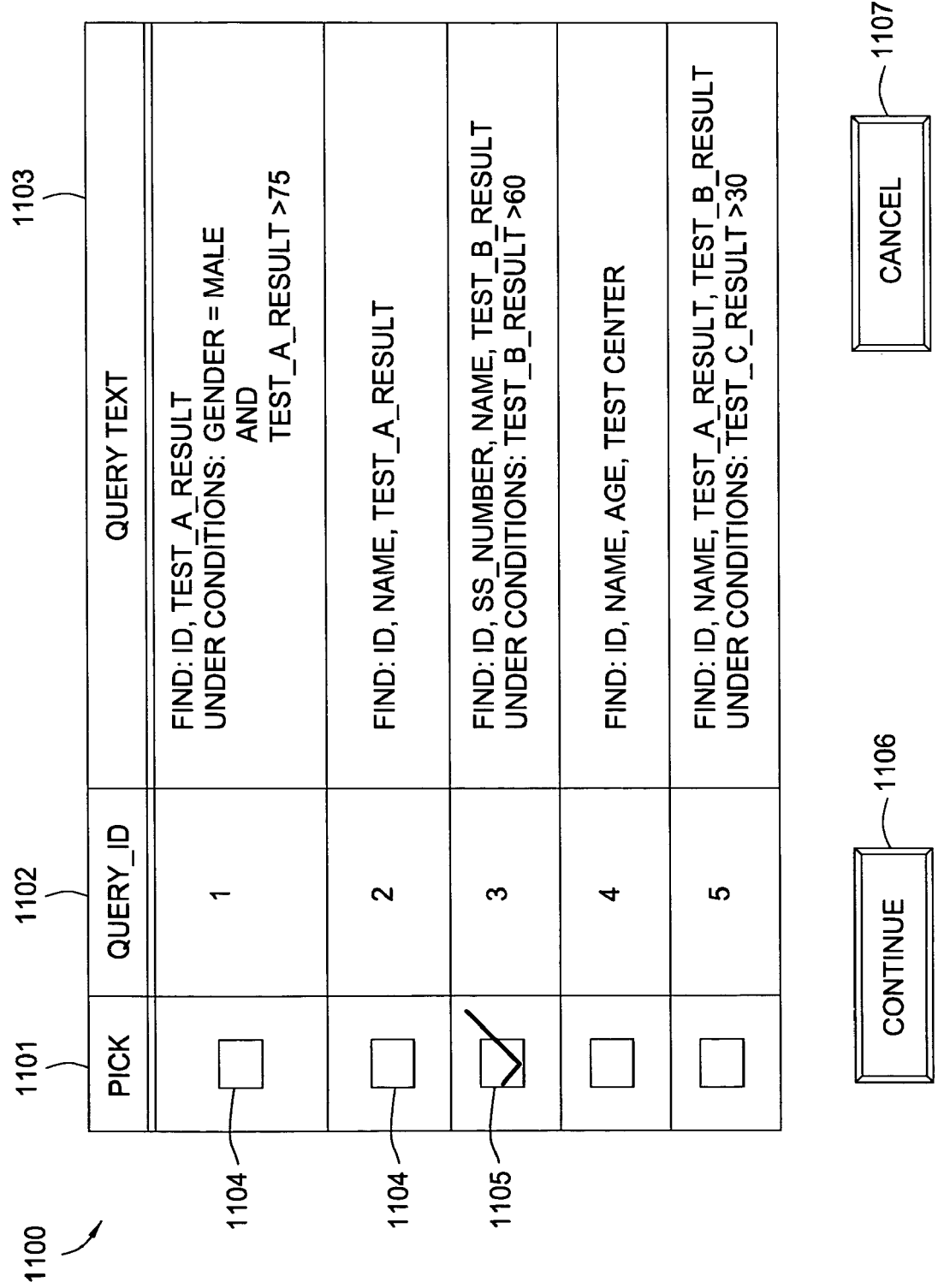
Figure 12:
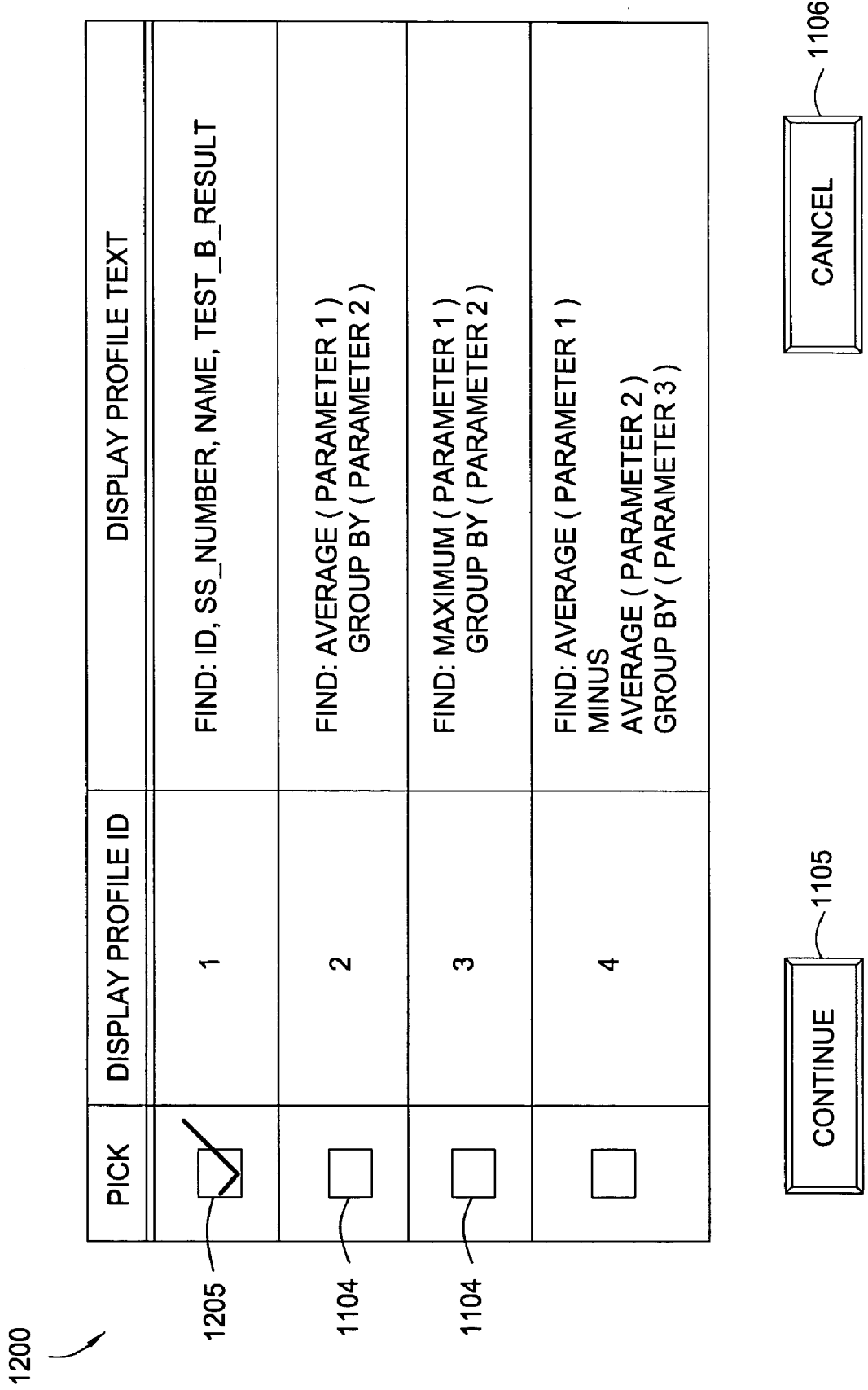
Figure 14:
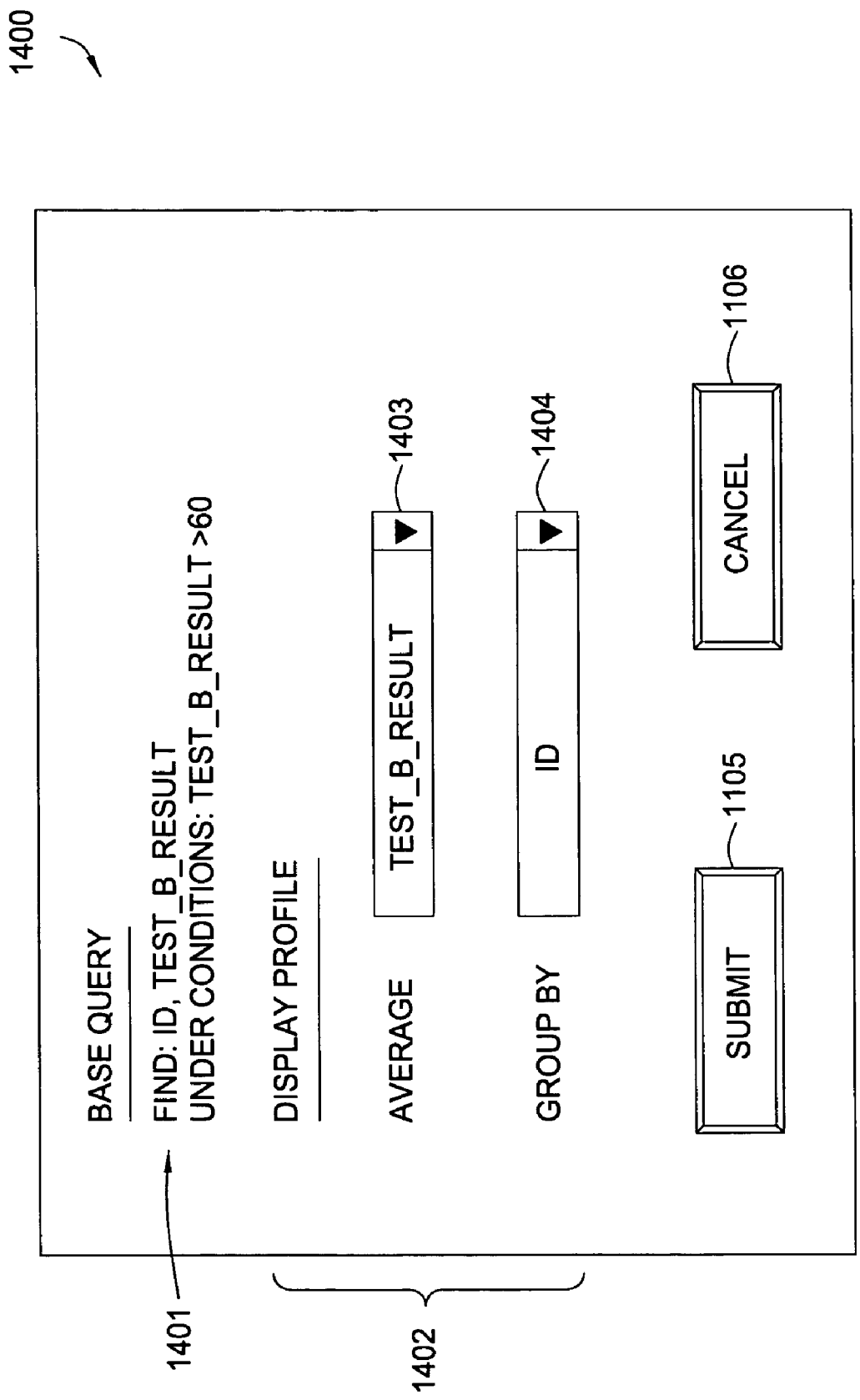

FIGS. 11-14 illustrate exemplary graphical user interface (GUI) screens in accordance with embodiments of the present invention. FIG. 11 presents the selection of a base query and FIG. 12 illustrates the selection of an display profile to be applied to the base query (both in abstract form) selected in FIG. 11. While the screens illustrated in FIGS. 11 and 12 describe the selection of available abstract queries and available display profiles, it should be understood that in other embodiments of the current invention, a query building interface may be available to allow the user to construct abstract queries and display profiles as desired. FIG. 13 is directed to the selection of join points during the application of a query-level display profile, and FIG. 14 illustrates the defining of parameters during the application of parameter-level display profiles.

FIG. 11 provides an exemplary GUI screen 1100 that allows for the selection of a base query from a list of available abstract queries, according to one embodiment of the invention. A column presenting Query ID's 1102 is positioned adjacent to the corresponding abstract query's text 1103.

A base query can be selected by picking the corresponding check box 1104 provided in column 1101. For instance, box 1105 has been checked, indicating that the corresponding query (Query ID ="3") has been selected. The selected abstract query specifies that ID's and their corresponding TEST_B_RESULTs be presented, under the condition that the TEST_B_RESULTs are greater than 60. Once the user is satisfied with the selection, the Continue button 1106 can be pushed, whereby the next screen, illustrated in FIG. 12, is presented.

FIG. 12 illustrates an exemplary GUI screen that provides multiple display profiles that can be selected and applied to the selected base query from FIG. 11. In one embodiment, the list of available display profiles only includes those display profiles in abstract form that are applicable to the selected base query. In this way the user need not sift through all the available display profiles. Rather, the user selects from only appropriate (applicable) display profiles.

For one embodiment, display profiles are determined to be applicable for a selected base query if they share all the columns in common with the selected base query. In other embodiments, user managed metadata describing attributes of base queries, including a list of applicable display profiles, may be referenced to determine which display profiles should be presented for a selected base query.

The layout and functionality of the display profile selection screen is very similar to the base query selection screen illustrated in FIG. 11. Display profile ID's and their corresponding text are provided in columns 1202 and 1203, respectively. For some embodiments, an additional column may be included to specify whether the display profile is query-level or parameter-level. A display profile can be picked for application to a base query by selecting the corresponding check box 1104. As can be seen by selected check box 1205, the display profile represented by Display Profile ID of "1" is selected. This particular display profile specifies that the ID, SS_NUMBER, NAME and TEST_B_RESULT data values be presented based on the merged query result set.

As stated earlier, in the case of applying a query-level display profile, join points between the base query and display profile must be determined. FIG. 13 presents a GUI screen that allows for the selection of a join point; this screen is presented when a query level display profile is applied to an abstract query. While the current example (illustrated in FIG. 13) presents two possible join points, other examples may have more than two possible join points. Further, certain combinations of base queries and display profiles may allow for the selection of more than one join point. For example, suppose the combination of a particular query-level display profile and a particular abstract query accommodates four separate join points, it is possible for the user to select multiple join points for linking that base query and display profile. Those skilled in the art will recognize that this is consistent with functionality offered by query languages such as SQL.

Referring back to FIG. 12, suppose the user picked a parameter-level display profile, such as the display profile assigned the Display Profile ID of "2" (second row), to be applied to the selected base query. That particular parameter-level display profile had two parameters that needed to be assigned values. FIG. 14 illustrates a screen for assigning values to parameters belonging to a parameter-level display profile. The chosen display profile comprises two parameters. Accordingly, the parameter assignment screen illustrated in FIG. 14 utilizes two drop down boxes 1403 and 1404 to allow the user to select the values (typically field names) that should be assigned to the corresponding parameters. For example, three drop down boxes would be presented if there were three parameters needed to be assigned values. Those skilled in the art will understand that while drop down boxes are shown, parameter values may be assigned via other objects such as text boxes or list boxes or any other appropriate graphical objects. Once the user is satisfied with the selections for parameter values, the Continue button 1105 is pushed, the base query and the parameter-level display profile will be converted into physical queries and then consolidated into a merged physical query and submitted to the RDBMS.

Figure 15:
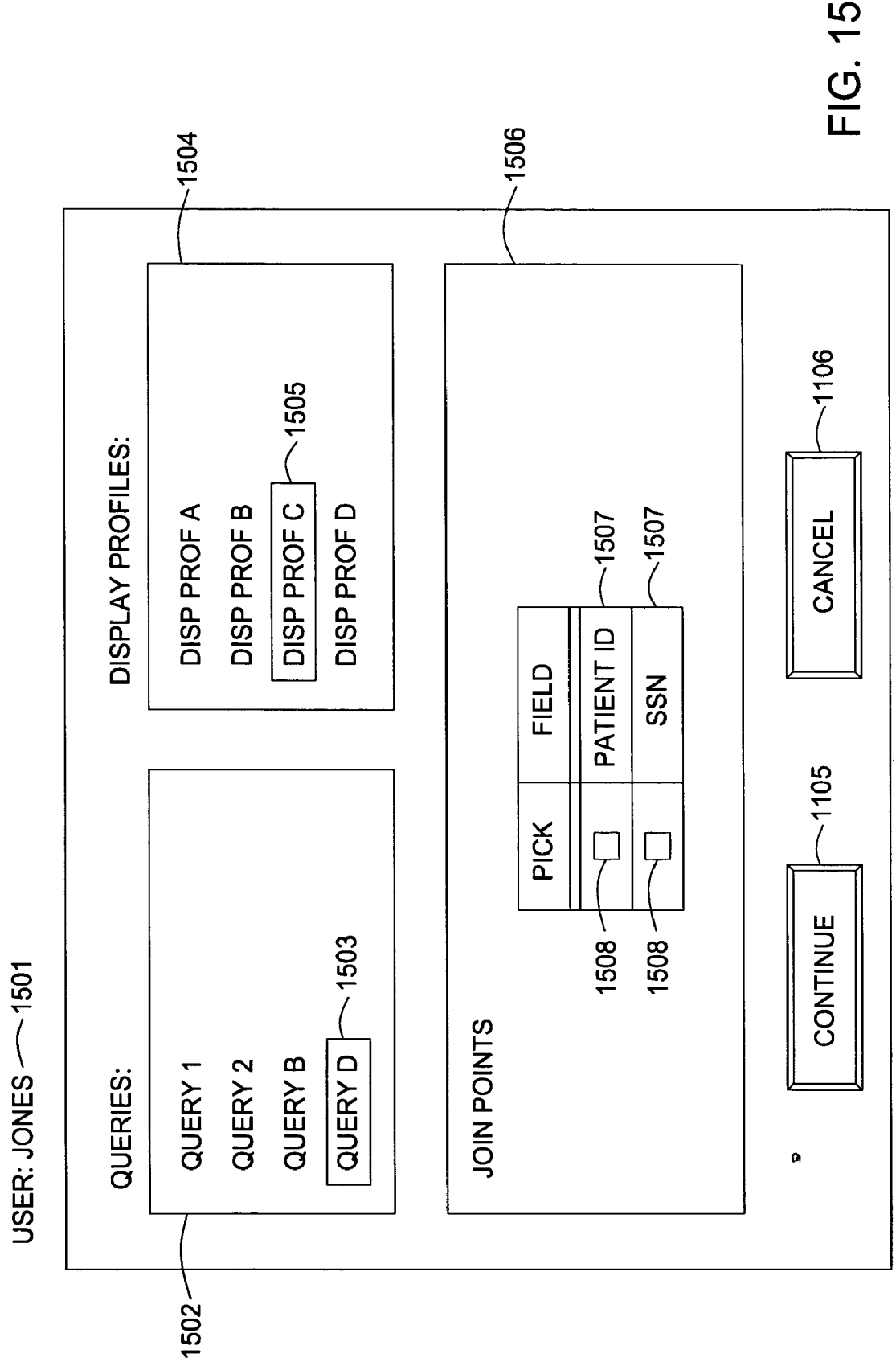
FIG. 15 illustrates the selection of a query-level display profile and the selection of join points between the selected abstract query as performed via a GUI screen.

In an alternative embodiment, the selection of an abstract query, the selection of a query-level display profile and the selection of join points between the selected abstract query, and the selected display profile can be performed via a GUI screen as illustrated in FIG. 15. As shown in FIG. 15, a user 1501 can select a particular abstract query from a collection of available abstract queries 1502. Based on the selected abstract query 1503, a collection of applicable display profiles 1504 (query-level and parameter-level) is provided. Suppose that the selected display profile 1505 is a query-level display profile. Based on the selected display profile 1505, all fields 1507 that can serve as join points between the selected abstract query 1503 and the selected display profile 1505 are presented with corresponding check boxes 1508 in a field association area 1506. Next, the user can select the desired join points and push the Continue button 1105 to proceed with processing as described with reference to other examples above.

Figure 16:
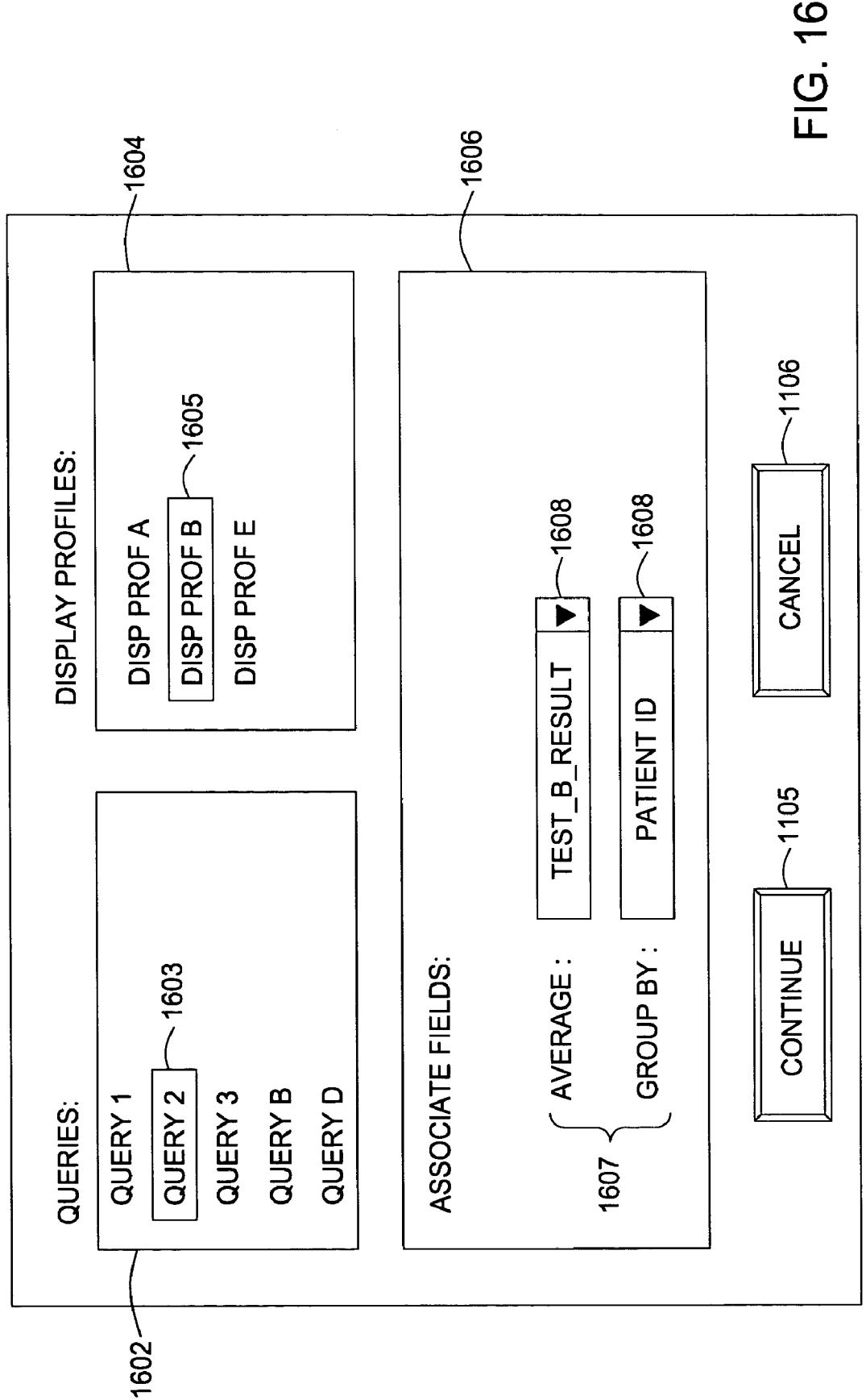
FIG. 16 illustrates the association of parameters from a parameter-level display profiled to fields from an abstract query as performed via a GUI screen.

In yet another embodiment, the selection of an abstract query, the selection of a parameter-level display profile, and the association of parameters from a parameter-level display profile to fields from an abstract query can be performed via a GUI screen as illustrated in FIG. 16. As shown in FIG. 16, a user 1601 can select a particular abstract query from a collection of available abstract queries 1602. Based on the selected abstract query 1603, a collection of applicable display profiles 1604 (query-level and parameter-level) is provided. Suppose that the selected display profile 1605 is a parameter-level display profile. Based on the selected display profile 1605, all parameters 1607 that need to be associated with fields from the selected abstract query 1603 are presented in the field association area 1606. Drop down boxes 1608 are provided and populated with the names of fields from the selected abstract query 1603. Next, the user can utilize the drop down boxes 1608 to select the desired fields to be passed as values for parameters of the display profile. Once satisfied with the field selections, the user can push the Continue button 1105 to proceed with processing as described with reference to other examples above.

Figure 17:
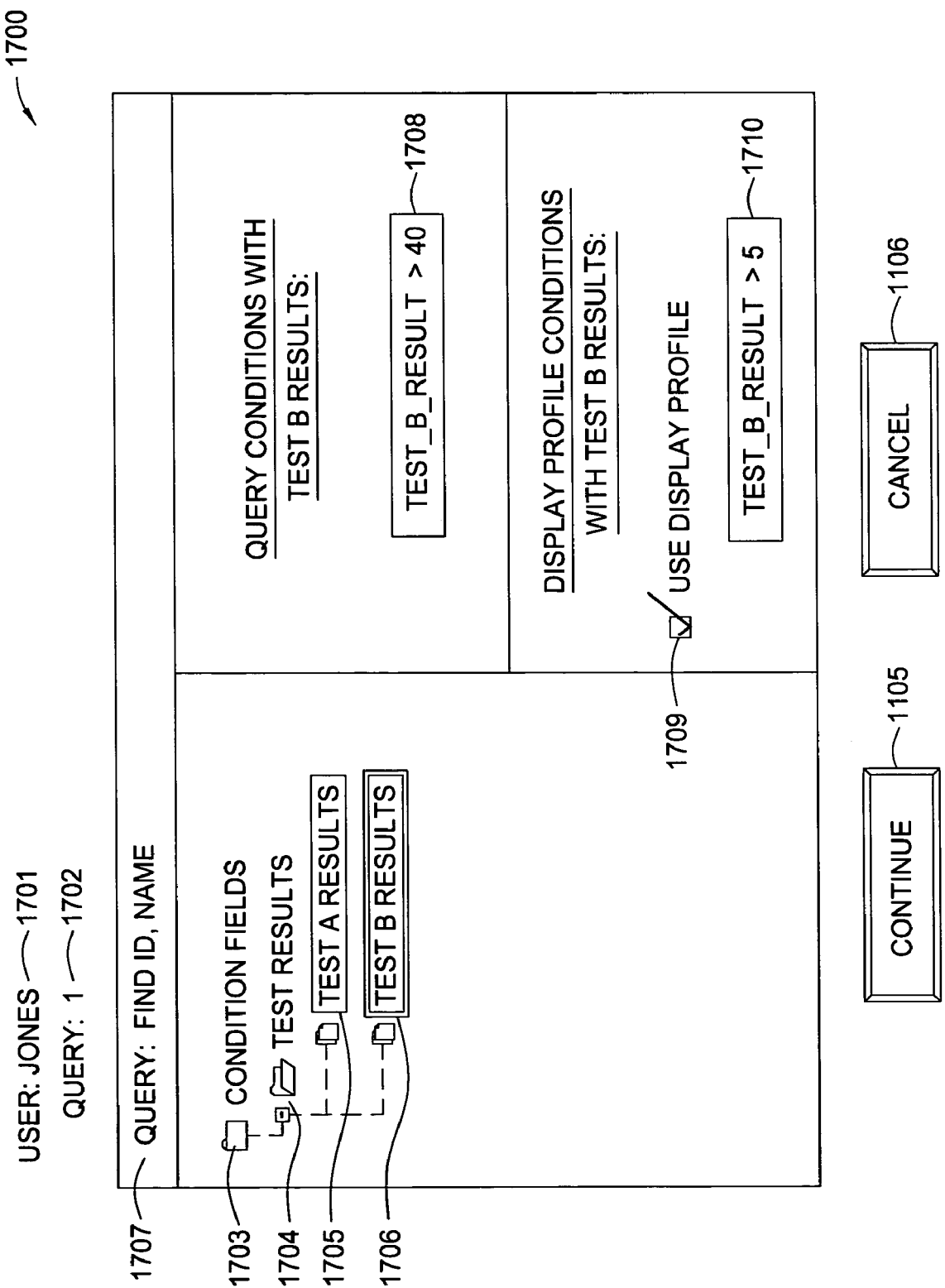
FIG. 17 illustrates a screen belonging to a query building application.

FIG. 17 illustrates a screen belonging to a query building application, according to one embodiment of the invention. The user 1701 is presented this screen after they have selected an abstract query 1702 to which conditionals utilizing logical fields are to be added. A collection of available logical fields are organized in a hierarchy of conditional fields 1703 that sorts the logical fields by functional category. The hierarchy is presented via a series of folders. For example, all logical fields related to testing results are provided in the Test Results folder 1704.

Upon selection of a logical field, such as Test B Result 1706, a free-form text box 1708 is presented to allow users to create and modify a conditional containing Test B Result

1706 that is to be added to the selected query 1702. As shown, the syntax for the complete abstract query is: "Find ID, NAME under conditions Test B Result >40." Additionally, if the user selects check box 1709, another free-form text box 1710 is provided to create a conditional for a display profile based on the Test B Result 1706 logical field. As shown, the syntax for the complete display query is: "Find ID, NAME under conditions Test B Result >5."

Once the user is satisfied with the conditionals, the Continue button 1105 can be selected to proceed with processing related to the newly formed abstract query and display profile. Alternatively, the user can select the Cancel button 1106 to leave the current screen without saving any changes.

CONCLUSION

The above examples demonstrate that embodiments of the present invention provide users the ability to apply one or more display profiles to base queries in order to alter the scope of abstract queries and to further process result sets as required. The functionality provided by embodiments of the present invention allows users to avoid the cumbersome task of manually modifying physical queries to achieve desired results.

While the foregoing is directed to embodiments of the present invention, other and further embodiments of the present invention may be devised without departing from the basic scope thereof, and the scope thereof is determined by the claims that follow.

What is claimed is:

1. A method for composing queries comprising:
providing a plurality of pre-defined abstract queries, wherein each pre-defined abstract query is composed of at least one logical field of a plurality of logical fields defined by a data abstraction model, the data abstraction model comprising logical field definitions mapped to physical data structures of a data repository, and wherein the pre-defined abstract queries are configured to retrieve data from the data repository by referencing the data abstraction model;
receiving a first selection, from a user, of an abstract query from the plurality of pre-defined abstract queries;
on the basis of the selected abstract query, determining one or more display profiles that can be applied to the selected abstract query, wherein the display profiles comprise a plurality of abstract query conditions;
receiving a second selection, from the user, of a display profile from the one or more display profiles determined to be applicable to the selected abstract query;
transforming the selected abstract query to an executable query of a given query language by referencing the data abstraction model;
transforming the selected display profile into a transformed instance of the selected display profile by referencing the data abstraction model, wherein the transformed instance of the selected display profile is in the given query language; and
generating, by operation of one or more computer processors, a merged executable query by combining the executable query and the transformed instance of the selected display profile, wherein the syntax of the executable query is preserved in the merged executable query, comprising:
identifying a common physical field of the data repository that is mapped to by both a first logical field from the selected abstract query and a second logical field from the selected display profile; and
linking the executable query and the transformed instance of the selected display profile at a join point defined by the identified common physical field.

2. The method of claim 1, wherein the field is selected by the user from a plurality of fields that appear in both the selected abstract query and the selected display profile.

3. The method of claim 1, further comprising:
submitting the merged executable query to a database management system for execution.

4. The method of claim 1, wherein the data repository is managed by a database management system.

5. The method of claim 1, wherein the data repository is a relational database managed by a relational database management system.

6. The method of claim 1, wherein the data repository is one of: a relational database, eXtensible Markup Language database, and object-relational database.

7. A method for composing queries comprising:
providing a plurality of pre-defined abstract queries, wherein each pre-defined abstract query is composed of at least one logical field of a plurality of logical fields defined by a data abstraction model, the data abstraction model comprising logical field definitions mapped to physical data structures of a data repository, and wherein the pre-defined abstract queries are configured to retrieve data from the data repository by referencing the data abstraction model;
receiving a first selection, from a user, of an abstract query from the plurality of pre-defined abstract queries;
on the basis of the selected abstract query, determining one or more query-level display profiles that can be applied to the selected abstract query, wherein query-level display profiles comprise a plurality of abstract query conditions, and are configured to alter the scope of the selected abstract query while preserving the syntax of the selected abstract query;
receiving a second selection, from the user, of a display profile from the one or more query-level display profiles determined to be applicable to the selected abstract query;
transforming the selected abstract query to an executable query of a given query language by referencing the data abstraction model;
transforming the selected display profile into a transformed instance of the selected display profile by referencing the data abstraction model, wherein the transformed instance of the selected display profile is in the given query language; and
generating, by operation of one or more computer processors, a merged executable query by combining the executable query and the transformed instance of the selected display profile, wherein the syntax of the executable query is preserved in the merged executable query, comprising:
identifying a common physical field of the data repository that is mapped to by both a first logical field from the selected abstract query and a second logical field from the selected display profile; and
linking the executable query and the transformed instance of the selected display profile at a join point defined by the identified common physical field.

8. The method of claim 7, wherein the field is selected by the user from a plurality of fields that appear in both the selected abstract query and the selected display profile.

9. The method of claim 7, further comprising:
submitting the merged executable query to a database management system.

10. The method of claim 7, wherein the data repository is managed by a database management system.

11. The method of claim 7, wherein the data repository is a relational database managed by a relational database management system.

12. The method of claim 7, wherein the data repository is one of: a relational database, eXtensible Markup Language database, and object-relational database.

13. A method for composing queries comprising:
providing a plurality of pre-defined abstract queries, wherein each pre-defined abstract query is composed of at least one logical field of a plurality of logical fields defined by a data abstraction model, the data abstraction model comprising logical field definitions mapped to physical data structures of a data repository, and wherein the pre-defined abstract queries are configured to retrieve data from the data repository by referencing the data abstraction model;
receiving a first selection, from a user, of an abstract query, from the plurality of pre-defined abstract queries;
on the basis of the selected abstract query, determining one or more parameter-level display profiles that can be applied to the selected abstract query, wherein parameter-level display profiles comprise a plurality of abstract query conditions and call existing functions to further process result sets of the selected abstract query while preserving the syntax of the selected abstract query;
receiving a second selection, from the user, of a display profile from the one or more parameter-level display profiles that can be applied to the selected abstract query;
transforming the selected abstract query to an executable query of a given query language by referencing the data abstraction model;
transforming the selected display profile into a transformed instance of the selected display profile by referencing the data abstraction model, wherein the transformed instance of the selected display profile is in the given query language; and
generating, by operation of one or more computer processors, a merged executable query by combining the executable query and the transformed instance of the selected display profile, wherein the syntax of the executable query is preserved, and wherein the executable query and the transformed instance of the selected display profile are linked based on associations defined between one or more logical fields from the selected abstract query and one or more parameters from the selected display profile, and wherein at least one of the existing functions called by the selected display profile is applied to at least one physical field of the data repository mapped to by the one or more logical fields from the selected abstract query.

14. The method of claim 13, wherein the associations defined between one or more fields from the selected abstract query and one or more parameters from the selected display profile are specified by the user.

15. The method of claim 13, wherein the data repository is a relational database managed by a relational database management system.

16. The method of claim 13, wherein the data repository is one of: a relational database, eXtensible Markup Language database, and object-relational database.

17. A method for composing queries comprising:
providing a plurality of pre-defined abstract queries, wherein each pre-defined abstract query is composed of at least one logical field of a plurality of logical fields defined by a data abstraction model, the data abstraction model comprising logical field definitions mapped to physical data structures of a data repository, and wherein the pre-defined abstract queries are configured to retrieve data from the data repository by referencing the data abstraction model;
receiving a first selection, from a user, of an abstract query from the plurality of pre-defined abstract queries;
on the basis of the selected abstract query, determining one or more query-level display profiles that can be applied to the selected abstract query, wherein query-level display profiles comprise a plurality of abstract query conditions, and are configured to alter the scope of the selected abstract query while preserving the syntax of the selected abstract query;
receiving a second selection, from the user, of a query-level display profile from the one or more query-level display profiles determined to be applicable to the selected abstract query;
on the basis of the selected abstract query, determining one or more parameter-level display profiles that can be applied to the selected abstract query, wherein parameter-level display profiles comprise a plurality of abstract query conditions and call existing functions to further process result sets of the selected abstract query while preserving the syntax of the selected abstract query;
receiving a third selection, from the user, of a parameter-level display profile from the one or more parameter-level display profiles that can be applied to the selected abstract query;
transforming the selected abstract query to an executable query of a given query language by referencing the data abstraction model;
transforming the selected query-level display profile to a transformed instance of the selected query-level display profile by referencing the data abstraction model, wherein the transformed instance of the selected query-level display profile is in the given query language;
transforming the selected parameter-level display profile to a transformed instance of the selected parameter-level display profile by referencing the data abstraction model, wherein the transformed instance of the selected parameter-level display profile is in the given query language; and
generating, by operation of one or more computer processors, a merged executable query corresponding to a combination of the executable query, the transformed instance of the first selected display profile and the transformed instance of the second selected display profile, in which the syntax of the executable query is preserved, comprising:
identifying a common physical field of the data repository that is mapped to by both a first logical field from the selected abstract query and a second logical field from the selected query-level display profile; and
linking the executable query and the transformed instance of the selected query-level display profile at a loin point defined by the identified common physical field.

* * * * *